Feb. 16, 1926. 1,573,086
C. L. MILLER ET AL
TONNEAU WINDSHIELD
Filed May 6, 1924
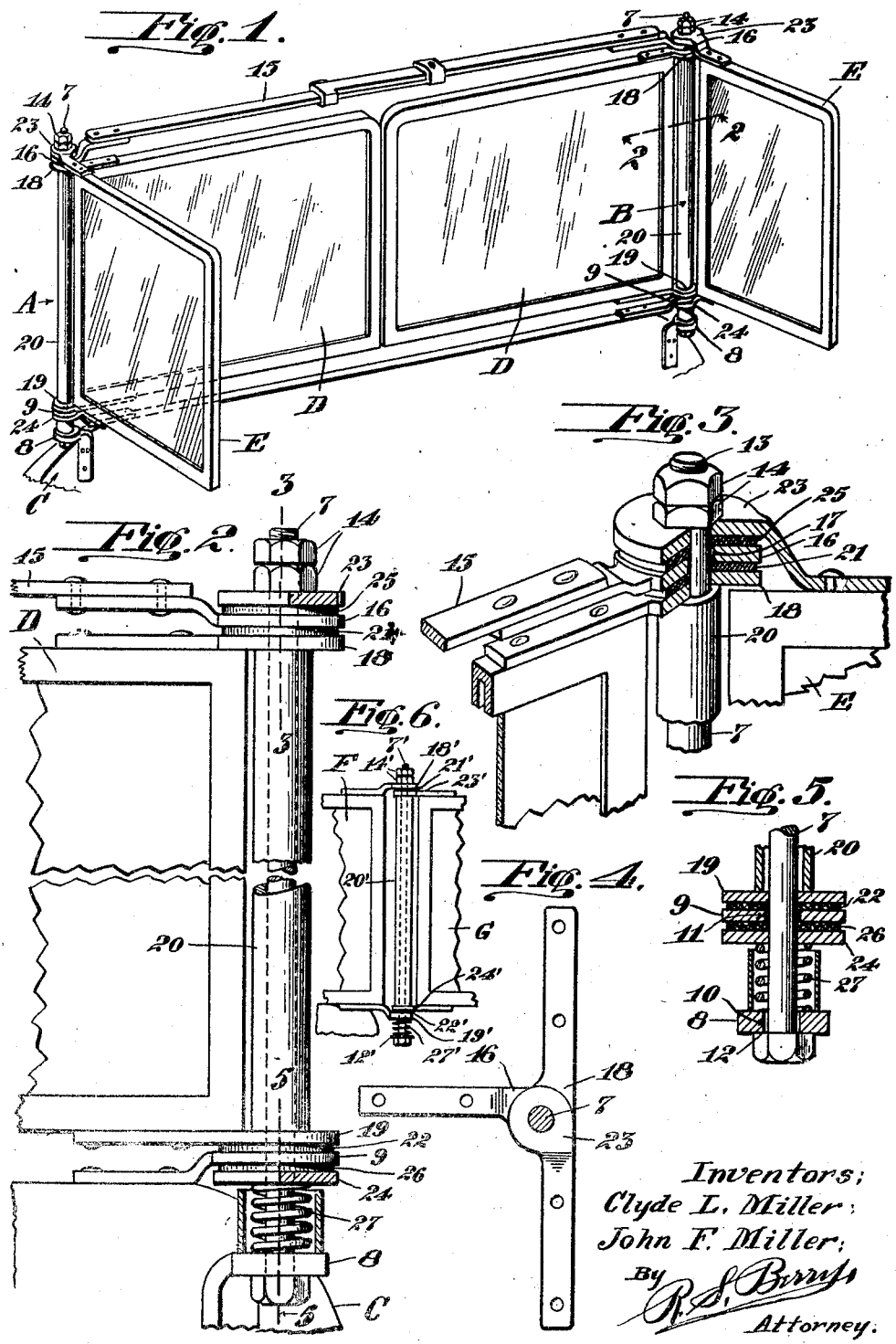
Inventors;
Clyde L. Miller,
John F. Miller,
By R. S. Burns
Attorney.

Patented Feb. 16, 1926.

1,573,086

UNITED STATES PATENT OFFICE.

CLYDE L. MILLER AND JOHN F. MILLER, OF LOS ANGELES, CALIFORNIA.

TONNEAU WINDSHIELD.

Application filed May 6, 1924. Serial No. 711,335.

*To all whom it may concern:*

Be it known that we, CLYDE L. MILLER and JOHN F. MILLER, citizens of the United States, residing at Los Angeles, in the county of Los Angeles and State of California, have invented new and useful Improvements in Tonneau Windshields, of which the following is a specification.

This invention particularly pertains to tonneau windshields of the type in which a pair of windshield wings is located adjacent each end of the back of the front seat on a motor vehicle with the wings of each pair mounted to swing on a vertical axis, whereby the wings of either or both pairs may be positioned to extend longitudinally of the seat back or extended longitudinally of the vehicle body to the front or rear of the seat back at the sides of the vehicle.

An object of the invention is to provide a tonneau windshield of the above character in which the pairs of windshield wings are so pivotally mounted that they may be swung to various positions under frictional resistance and maintained stationary against free movement in any desired position on their pivotal mounting.

Another object is to provide an effective means for affording a desired frictional resistance to movement of the windshield wings embodying means whereby the frictional resistance may be varied and regulated as occasion may require.

A further object is to provide a tonneau windshield which may be readily applied to a vehicle and securely braced so as to afford a substantial mounting for the windshield wings.

With the foregoing objects in view, together with such other objects and advantages as may subsequently appear, the invention resides in the parts, and in the combination, construction and arrangement of parts as hereinafter described and claimed, and illustrated by way of example in the accompanying drawings, in which—

Figure 1 is a perspective view of the tonneau windshield, showing it as applied.

Figure 2 is a detail in elevation as seen in the direction indicated by the arrows 2—2 of Figure 1, with parts broken away.

Figure 3 is a detail in section and perspective as seen on the line 3—3 of Figure 2.

Figure 4 is a plan view of one of the windshield wing mountings, showing it as detached.

Figure 5 is a view in vertical section as seen on the line 5—5 of Figure 2.

Figure 6 is a detail in elevation, illustrating a modification of the invention and showing it as applied to a tonneau windshield embodying a stationary panel and a movable wing.

Referring to the drawings more specifically, A and B indicate a pair of spaced standards here shown as mounted on the back portion C of the front seat of a vehicle, and which standards serve as supports for the tonneau windshield wings; the standards A and B each carrying a complementary pair of windshield wings D and E, which wings are pivotally mounted on the standards to swing to various positions thereon. Each of the standards A and B includes a vertically extending rod 7, the lower end portion of which is engaged by a pair of spaced superimposed, horizontally extending members 8 and 9 rigidly mounted on the seat back, and which members are formed with openings 10 and 11, respectively, through which the rod 7 extends. The member 8 constitutes a bracket, which is here shown as secured to the vertical back wall of the seat, and the member 9 constitutes a plate which is rigidly secured to the upper edge of the seat back. The lower end of the rod 7 is provided with a shoulder 12 which abuts against the under side of the bracket 8, and the upper end portion of the rod 7 is formed with screw threads 13 to receive nuts 14.

The upper ends of the pair of standards A and B are connected together by a longitudinally adjustable tie-rod 15, the ends of which rod are fitted with plates 16 having openings 17 therein through which the upper end portions of the rods 7 project.

The windshield wings D are fitted with ears 18 and 19 at their upper and lower edges, respectively, which ears project from the end of the wings and are formed with openings through which the rods 7 extend to form a pivotal connection between the windshield wings D and the standard. Extending between the ears 18 and 19 and encompassing the rod 7, is a tubular sleeve 20 which serves as a housing for the portion of the rod extending between the ears 18 and 19 and also serves to maintain the ears 18 and 19 in proper spaced relation. The ears 18 and 19 engage the rod 7 intermediate the plates 9 and 16, and interposed between the ear 18 and the plate 16, and between the ear 19 and the plate 9 are friction washers 21 and 22, respectively.

A pair of end brackets 23 and 24 are mounted on the upper and lower edges respectively of the windshield wings E which brackets are formed with openings through which pass the rod 7, thereby forming a pivotal connection between the windshield wings E and the standards. The bracket 23 engages the rod 7 above the plate 16, and interposed between the bracket 23 and the plate 16 is a friction washer 25. The bracket 24 engages the rod 7 below the plate 9, and interposed between the brackets 24 and the plate 9 is a friction washer 26.

It will now be seen that the plate 16 affords a stationary element between the pivotally supported ear 18 and bracket 23 at the upper portion of the windshield wings D and E, respectively, and that the plate 9 affords a stationary element between the ear 19 and bracket 24 at the lower edges of the windshield wings D and E, respectively. It will also be observed that a friction washer is located at the opposite sides of each of the stationary elements formed by the plates 9 and 16, against which seat the pivotal ears and brackets carried by the windshield wings.

The bracket 8 is spaced below the pivoted bracket 24, and bearing between the brackets 8 and 24 is a tensioned spiral spring 27 which exerts a yieldable upward pressure on the bracket 24 and thereby affords a resilient or yieldable support for the windshield wing E. The stationary plate 9 with the superimposed friction washer 22 supports the windshield wing D.

The several friction washers are designed to offer resistance to turning of the windshield wings on their pivotal connections with the rod 7, yet permit the windshield wings to be swung to various positions. The friction washers may be of any suitable construction being preferably formed of a hard fibrous material, of such character as to afford frictional engagement with the surfaces of the members bearing thereon. The frictional resistance of the washers may be varied by adjusting the nuts 14 on the rod 7. For example, on tightening the nuts 14 on the rod 7 against the bracket 23, this bracket, together with the washer 25, plate 16, washer 21, ears 18 and 19, washer 22, and bracket 24 will be advanced on the rod 7 in opposition to the spring 27 bearing against the bracket 24, so as to cause the washer 22 to bear on the stationary plate 9 with the ear 19 seated thereon, and also cause the washers 25 and 21 to be pressed between the stationary plate 16 and the bracket 23 and ear 18, respectively. The washers 25, 21 and 22 may thus be subjected to various pressures by tightening or loosening the nuts 14 so as to impart varying frictional resistance to the turning of the windshield wings. It is to be observed that by providing the spring 27 between the brackets 8 and 24, the several friction washers opposing turning of the windshield wings will be collectively under spring pressure.

An important feature of the invention resides in providing the stationary plates 9 and 16 between the pivotal connections of the pair of wings D and E with the standard, whereby either of the wings may be turned on its pivot independent of and without effecting movement of the other.

By engaging the rods of the standards at their lower end portions with the spaced, fixed members 8 and 9, and by tying the upper end portions of the pair of rods together by means of the tie-rod 15, the structure is thoroughly braced so as to render it stable, and by employing the construction set forth the structure may be readily assembled and the windshield wings and standards easily detached, should occasion require, as by removing the nuts 14 the rods 7 may be withdrawn thereby freeing the parts of the windshield so that they may be readily separated.

The brackets 23 and 24 are sufficiently flexible as to be drawn toward each other under the tension of the spring 27 so that the lower bracket 24 will be caused to bear upwardly and press the friction washer 26 between the bracket 24 and the fixed plate 9. A permanent tension is thus imposed on the friction elements so as to obviate adjustment to compensate for wear thereof.

In the modified form of the invention shown in Figure 6, F indicates a stationary windshield panel which is rigidly mounted on the seat back, which panel is formed with end ears 18′ and 19′, and G indicates a windshield wing having end brackets 23′ and 24′. The brackets 23′ and 24′ extend between the ears 18′ and 19′, and a rod 7′ extends through apertures in the ears and brackets to form a pivotal mounting for the latter. The rod 7′ is formed with a shoulder 12′ at its lower end, and interposed between this shoulder and the ear 19′ is a tensioned spiral spring 27′, and screwed on the upper end of the rod 7′ and bearing on the bracket 18′ are adjustment nuts 14′. Interposed between the ear 18′ and bracket 23′ and between the ear 19' and bracket 24' are friction washers 21' and 22', respectively. By tightening the nuts 14' on the rod 7' the rod is drawn upwardly in opposition to the spring 27', thereby placing the latter under tension so that the adjacent ears and brackets will be caused to bear on the friction washers therebetween with a yieldable pressure; the ears 18' and 19' being sufficiently flexible to permit their thus being drawn into close contact with the washers. A sleeve 20' embraces the rod 7' and extends between the brackets 23' and 24' to hold the latter in proper spaced relation in opposition to the pressure brought to bear thereon. By providing the spring 27' a permanent tension may be imposed on the friction disks thereby obviating adjustment to compensate for wear, as the spring serves to exert a pull on the rod 7' tending to draw the ears 18' and 19' toward each other as the friction washers wear.

We claim—

1. In a tonneau windshield, a standard including a vertical rod, a fixed bracket engaging the lower end portion of the rod, a windshield wing having a pair of brackets pivotally engaging said rod, a spring interposed between the fixed bracket and the lowermost bracket on said windshield wing, a second windshield wing having ears pivotally engaging said rod intermediate the pivoted brackets on the other windshield wing, stationary elements encompassing the rod intermediate the pivoted ears and brackets, and means for affording a frictional contact between each of said stationary elements and the contiguous ears and brackets.

2. In a tonneau windshield, a standard including a vertical rod, a fixed bracket engaging the lower end portion of the rod, a windshield wing having a pair of brackets pivotally engaging said rod, a spring interposed between the fixed bracket and the lowermost bracket on said windshield wing, a second windshield wing having ears pivotally engaging said rod intermediate the pivoted brackets on the other windshield wing, stationary elements encompassing the rod intermediate the pivoted ears and brackets, means for affording a frictional contact between each of said plates and the contiguous ears and brackets, and means whereby the frictional resistance between said plates and the adjacent ears and brackets may be collectively regulated.

3. In a tonneau windshield, a fixed bracket, a rod projecting vertically from said bracket, a windshield wing pivoted on said rod, said windshield wing having a pair of spaced brackets pivotally connected to said rod and movable longitudinally thereof, a spring affording a yieldable support for said windshield wing, a second windshield wing having ears pivotally connected to said rod, a fixed plate forming a support for said last named wing, and screw means on said rod operable to vary the tension of said spring and adapted to transmit pressure of said spring to said second windshield wing whereby the latter will bear on said fixed plate under spring pressure.

4. In a tonneau windshield, a pair of spaced standards each of which includes a vertical rod, a fixed bracket engaging the lower end portion of the rod of each standard, a fixed plate encompassing each rod in superimposed spaced relation to the fixed bracket, a tie-rod connecting the upper portions of said standards including plates slidably engaging said rods, a pair of windshield wings mounted on each of said standards one of said wings having ears pivotally connected to said rod intermediate the fixed plate and the plate on the tie-rod, and the other of said wings having a pair of brackets pivotally connected to said rod said brackets engaging the rod on the side of said plates opposite the ears, friction washers interposed between said plates and the contiguous brackets and ears, and means for imposing adjustable spring pressure on the pivotal bearings of each pair of windshield wings collectively.

5. In a tonneau windshield, a fixed bracket, a fixed plate superimposed relative to said bracket and spaced therefrom, said bracket and plate being formed with vertically aligned apertures, a rod detachably insertible through the apertures in said bracket and plate having a shoulder adapted to abut against the under side of the bracket, a windshield wing including a pair of spaced end brackets formed with apertures to slidably receive said rod and effect pivotal connection therewith, the lowermost of said brackets being engaged by said rod intermediate the aforesaid fixed bracket and plate, a second windshield wing including spaced end ears having apertures to receive said rod, said ears engaging said rod above said fixed plate and below the upper bracket on the other windshield wing, a tie-rod including an apertured end plate slidably engaging the rod intermediate the upper ear and bracket of the windshield wings, and a nut screwed on said rod cooperating with the shoulder on the latter to hold the parts in assembled condition.

6. In a tonneau windshield, a standard including a vertical rod, stationary means at the lower end of said rod to support the same, a stationary plate having an aperture within which said rod is slidably fitted, said plate being located near the lower end of said rod above said stationary means, a windshield wing, a bracket fixed thereto, said bracket underlying said plate and having an aperture through which said rod loosely extends, and a compression spring between said stationary supporting means and said bracket to hold said bracket in adjusted position.

7. In a tonneau windshield, a pair of vertical rods, means adjacent the lower ends of said rods to support them in upright positions, spacing means attached solely to said rods to hold their upper ends in spaced relation to each other, windshield wings loosely mounted on said rods, and springs tending to move said wings lengthwise of said rods, said springs co-operating with said supporting means and with spacing means to hold said wings in adjusted position.

CLYDE L. MILLER.
JOHN F. MILLER.